JOSEPH HEAD.
Heating Apparatus.

No. 117416 — Patented Jul 25 1871

Witnesses.
Villette Anderson
[signature]

Inventor.
Jos Head
Chipman Osmer
attys

UNITED STATES PATENT OFFICE.

JOSEPH HEAD, OF ANDOVER, NEW YORK.

IMPROVEMENT IN WATER-HEATERS.

Specification forming part of Letters Patent No. 117,416, dated July 25, 1871.

*To all whom it may concern:*

Be it known that I, JOSEPH HEAD, of Andover, in the county of Allegany and State of New York, have invented a new and valuable Improvement in Heating Apparatus; and I do hereby declare that the following is a full, clear, and exact description of the construction and operation of the same, reference being had to the annexed drawing making a part of this specification, and to the letters and figures of reference marked thereon.

Figure 1:
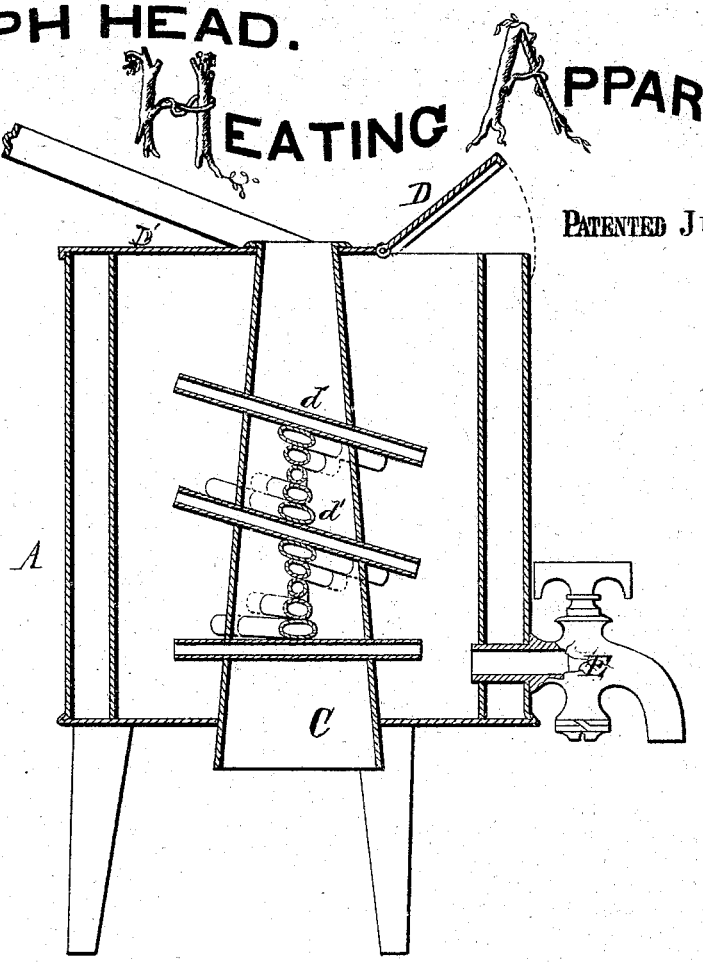
Figure 2:
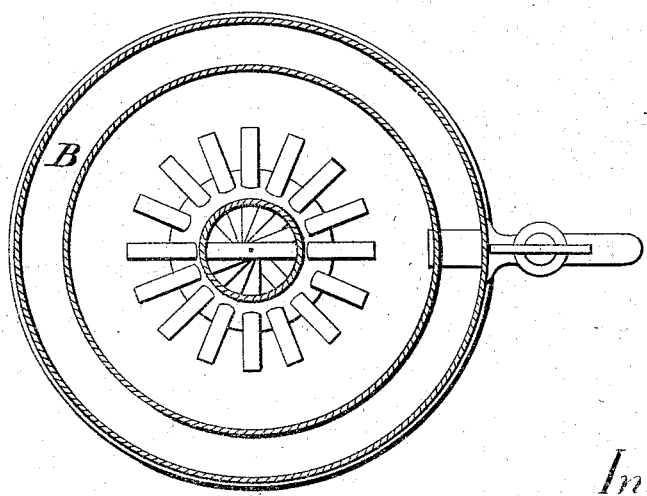

Figure 1 of the drawing is a representation of a central vertical section of my apparatus. Fig. 2 is a top view of the same.

This invention relates to water-heaters used in connection with kerosene-oil lamps; and consists in the novel construction and arrangement of a double-chambered vessel provided with a cone-opening, in which is inserted a series of transverse pipes for the purpose of heating more rapidly whatever may be within the vessel.

In order to enable others skilled in the art to which my invention appertains to make and use the same, I will now proceed to describe its construction and operation.

In the accompanying drawing illustrating this invention, A represents a cylindrical vessel, into which a sufficient quantity of water is introduced. B represents a chamber surrounding the vessel A, as shown in the drawing. The object of this chamber B is to provide an air-jacket around the vessel for the prevention of undue radiation of heat. C indicates a conical passage or tube passing up through the center of the vessel, as shown on the drawing in Fig. 1. This cone is securely fastened in said vessel and projects a short distance below the bottom of the same. Through this cone pass the flame, smoke, and heat. Passing transversely through the cone C is a series of pipes, $d'$, crossing each other at different angles, so that the water may pass in said pipes and be heated. By this construction it will be seen that I obtain a great amount of heating-surface without in any way interfering with the draught. D represents a hinge-cover secured to the top $D'$ of the vessel. E indicates an ordinary faucet to draw off the warm water.

It will be seen from the above description that when the vessel A is set over a lamp the flame and heat will ascend up through the tube-cone C and around the pipes $d'$, thus heating the contents of the vessel very rapidly.

This heater, although especially designed for kerosene-lights, as described, may be used in the same construction over other flames, as gas, alcohol, coal-oil, &c.

I claim as my invention—

The heating-vessel A provided with the air-chamber B, and the flame-passage C with its helical series of crossed pipes $d'$, substantially as specified.

In testimony that I claim the above I have hereunto subscribed my name in the presence of two witnesses.

JOSEPH HEAD.

Witnesses:
 O. P. CRANDALL,
 FRANCIS DULY.